Fig. 5.

UNITED STATES PATENT OFFICE.

THOMAS O'BRIEN, OF NEW YORK, N. Y.

BOTTLE-CAPPING MACHINE.

1,241,141.

Specification of Letters Patent. Patented Sept. 25, 1917.

Application filed February 6, 1915. Serial No. 6,555.

*To all whom it may concern:*

Be it known that I, THOMAS O'BRIEN, a citizen of the United States, and resident of New York city, borough of Bronx, in the county of Bronx and State of New York, have invented certain new and useful Improvements in Bottle-Capping Machines, of which the following is a specification.

My invention relates to improvements in machines for applying caps upon bottles, such, for instance, as caps commonly called "crowns", and the objects of my invention are to provide simple and efficient means for receiving and successively applying the caps upon succeeding bottles; to automatically supply the caps to such applying means; and to automatically feed bottles into position to be capped and to remove them therefrom successively.

Further objects of my invention, as well as novel details of improvement and combinations of parts comprised in my invention, will be more fully hereinafter set forth and then pointed out in the claims.

Reference is to be had to the accompanying drawings forming part hereof, wherein:

Fig. 1ᵃ is a plan view of Fig. 1;

The machine illustrated in the accompanying drawings is shown provided with two capping heads, separate means for applying caps to said heads, and means for successively feeding bottles in two rows beneath said capping heads, whereby bottles may be simultaneously capped, two at a time, successively. It will be understood, however, that one or more sets of capping devices may be utilized in a machine, as desired, and that the description of one set of such devices, as herein given will be considered to be applicable to any desired number thereof.

Figures 1, 2:
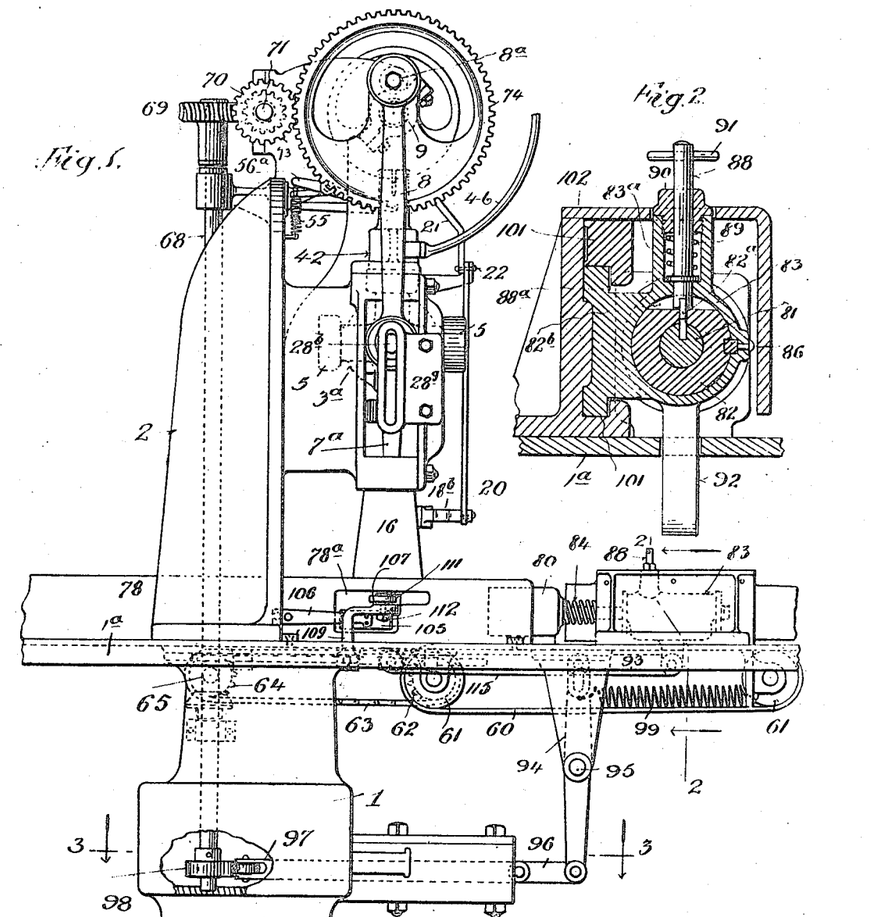
Figure 1 is a partly broken side elevation of a capping machine embodying my invention.
Fig. 2 is an enlarged cross section on the line 2, 2, in Fig. 1.
Figure 6:
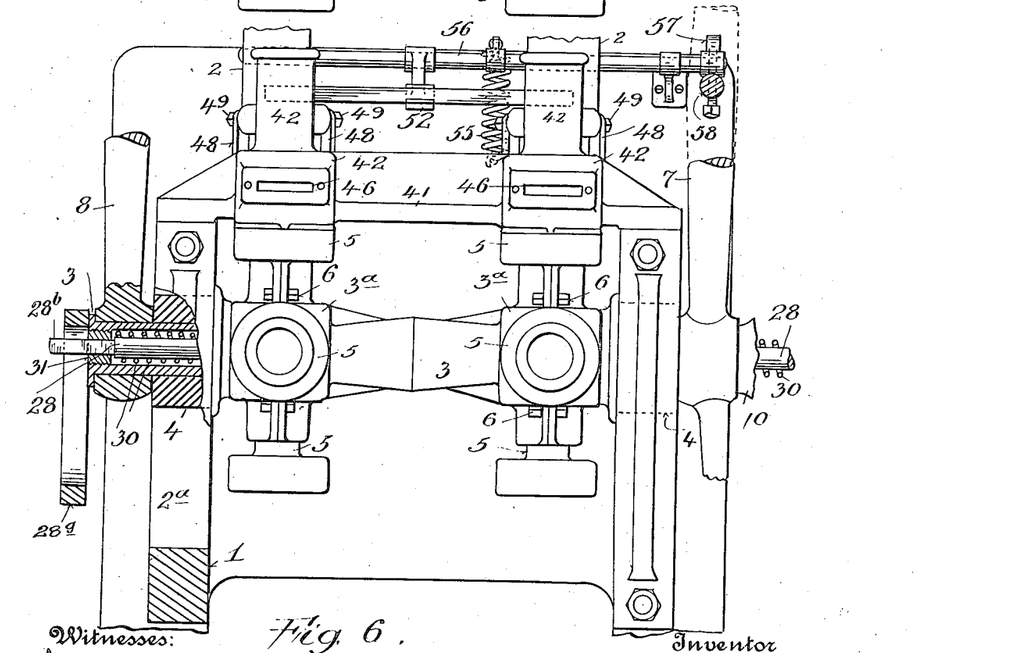
Fig. 6 is an enlarged face view, partly broken and partly in section, illustrating the bottle capping devices.
Figure 7:
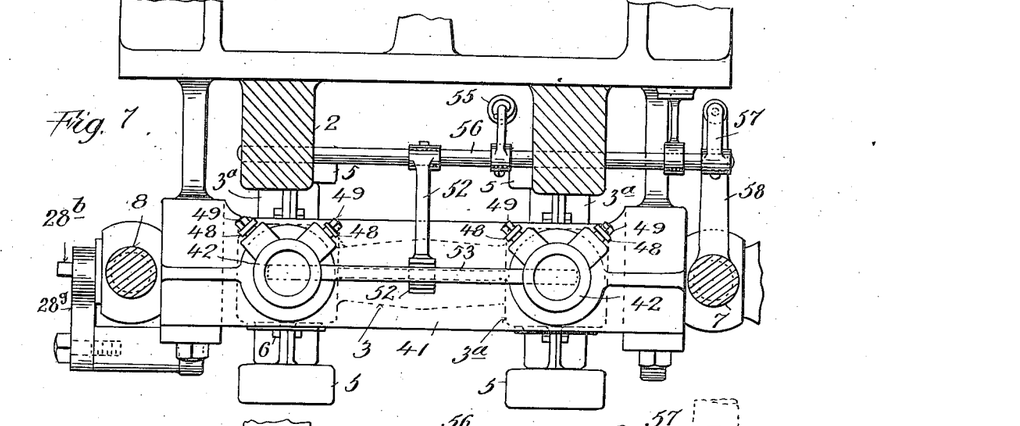
Fig. 7 is a partly sectional plan of Fig. 6.
Figure 8:
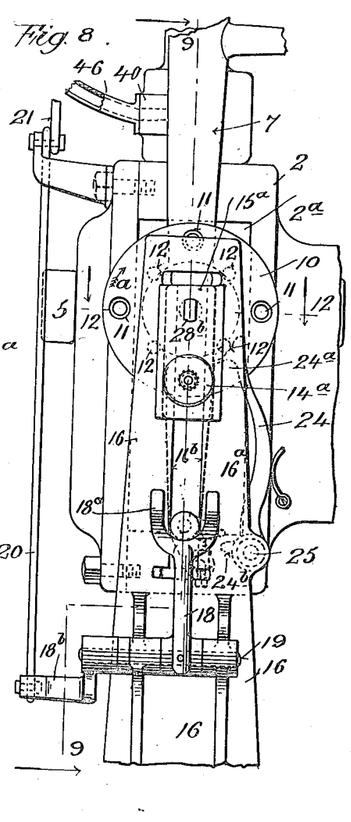
Fig. 8 is an enlarged detail side view of a portion of Fig. 1, illustrating the devices for operating the capping head.
Figures 9, 10, 11, 12:
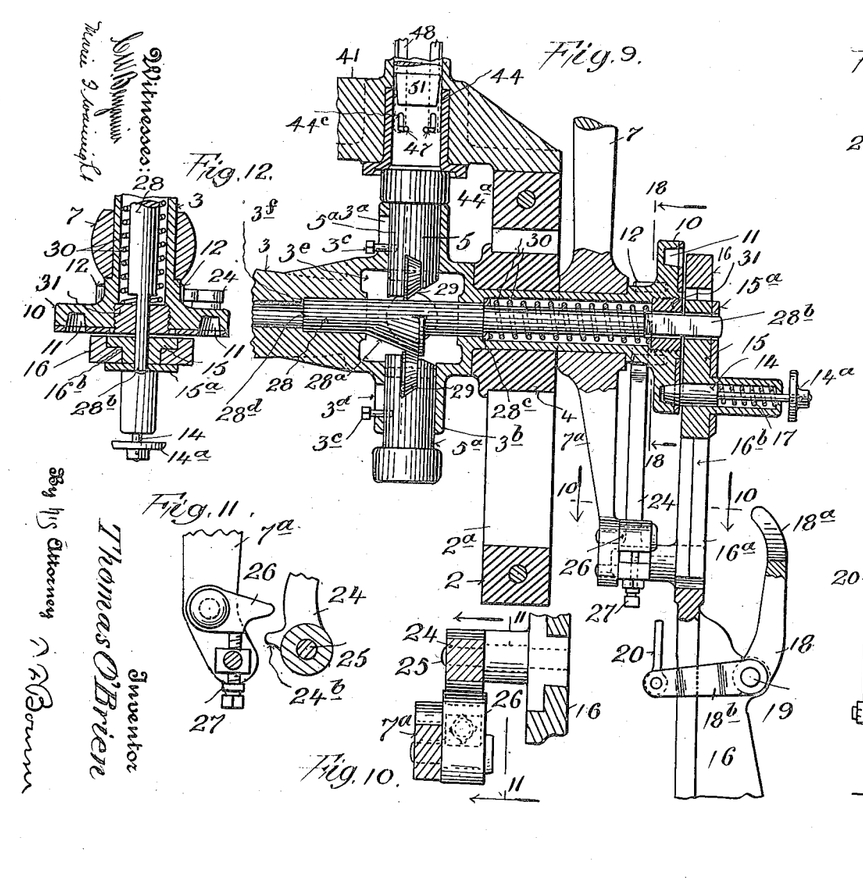
Fig. 9 is a section substantially on the line 9, 9, in Fig. 8.
Fig. 10 is a detail section on the line 10, 10, in Fig. 9.
Fig. 11 is a detail section on the line 11, 11, in Fig. 10.
Fig. 12 is a detail section substantially on the line 12, 12, in Fig. 8.
Figures 13, 14, 15, 16, 17, 18:
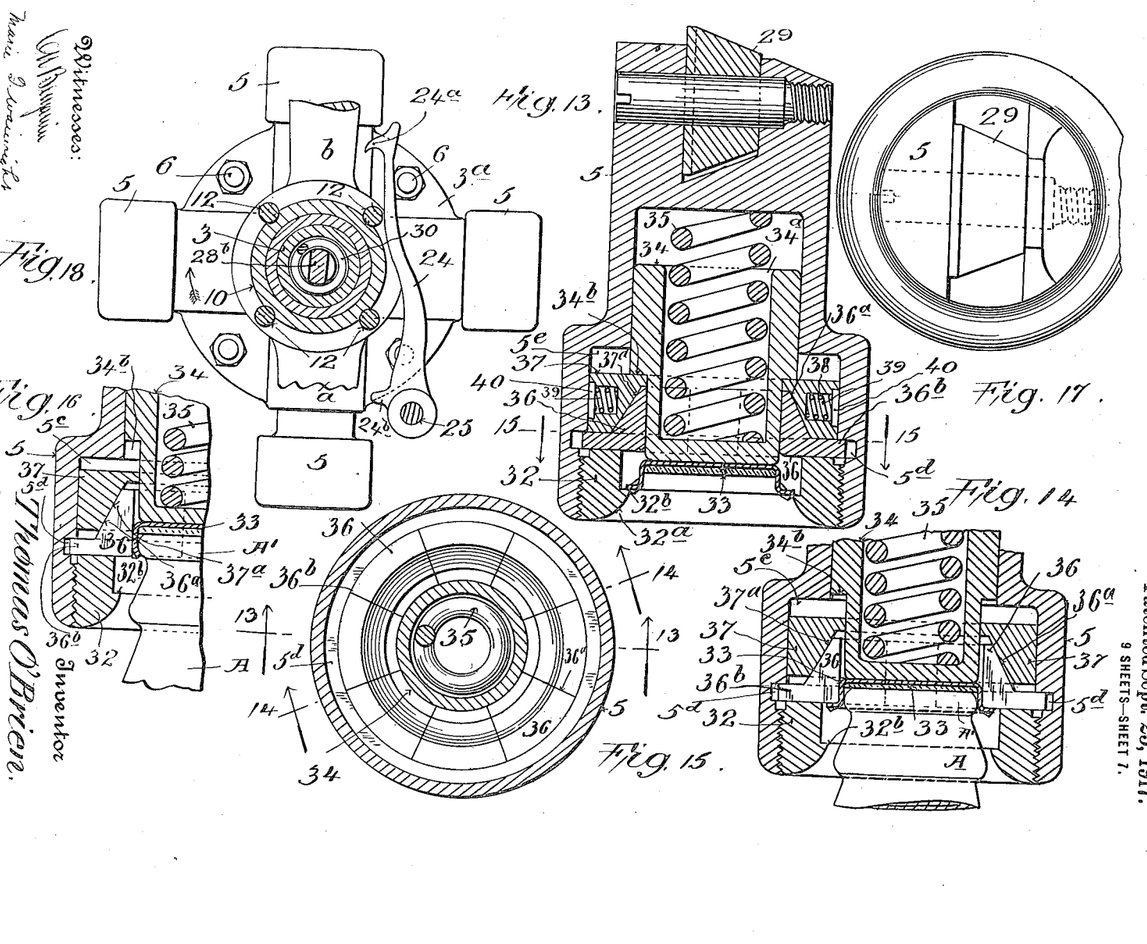
Fig. 13 is an enlarged detail section through one of the capping members, substantially on the line 13, 13, in Fig. 15.
Fig. 14 is a similar view illustrating a cap partially applied upon a bottle mouth, taken substantially on the line 14, 14, in Fig. 15.
Fig. 15 is a section on the line 15, 15, in Fig. 13.
Fig. 16 is a fragmentary detail of Fig. 14, illustrating the cap compressed upon the bottle mouth.
Fig. 17 is a plan view of Fig. 13.
Fig. 18 is a sectional detail view, illustrating the capping head in a depressed position on the line 18, 18, in Fig. 9.

In the accompanying drawings the numeral 1 indicates a main frame of any suitable construction. Said frame is shown provided with standards or uprights 2, and at 3 is a member shown journaled in blocks 4 (Figs. 6 and 9) guided to reciprocate in ways or guides 2ᵃ on said standards or uprights. The member 3 is provided with one or more capping heads indicated generally at 3ᵃ, the member 3 and said head or heads being adapted to reciprocate to apply caps upon the bottles. The head or heads 3ᵃ are provided with any desired number of radially disposed capping members 5 that are adapted to slide in bores 3ᵇ (Fig. 9) in head 3ᵃ. The head 3ᵃ may comprise two members having partial bores between them, said members being adapted to be secured together by bolts or screws 6. The head 3ᵃ may be provided with any desired number of radially disposed bores 3ᵇ receiving a corresponding number of capping members 5, each of said heads being shown provided with four of said bores and members 5 in the accompanying drawings. Upon the table or plate 1ᵃ of frame 1, bottles A to be capped are adapted to be placed beneath a capping head. To reciprocate member 3 with respect to the bottles, and to rotate said member with its capping devices step by step, or periodically, for the bottles to be capped, I have illustrated the following arrangement: The ends of member 3 projecting beyond the blocks 4 are journaled in links or rods 7, 8, operatively connected with crank pins 7', 8ᵃ, on a shaft 9 that is journaled in bearings on standard 2 (Figs. 1, 1ᵃ, 4 and 5). Means for rotating said shaft will be hereinafter described. Member 3 is provided with a disk or plate 10 having equally spaced apertures or recesses 11 corresponding to the capping members 5 of head 3ᵃ, and said disk is shown provided with equally spaced pins or projections 12 corresponding to said capping heads (Figs. 8, 9, and 18). The recesses 11 are adapted to receive a pin 14 (Figs. 1ᵃ, 4 and 9) that is carried in a suitable slide or block 15, guided to reciprocate in a guideway 16ᵃ in a standard 16 carried by the main frame. By means of the ways 16ᵇ coacting with corresponding ways on slide 15, and the plate 15ᵃ secured upon slides 15, the latter is retained in the guideway 16ᵃ, (Fig. 12). The pin 14 is normally pressed toward disk or plate 10 by a suitable spring 17 (Fig. 9). The relation of the parts is such that member 3 and the capping head or heads are retained, by pin 14 entering a corresponding recess 11, in proper position with one of the capping heads above a bottle, and when member 3 and the capping head descend, the slide 15 will also descend. Thereupon an enlargement or head 14ᵃ upon pin 14 will pass outside of a fork 18ᵃ on a rock arm 18 that is pivotally supported at 19 upon standard 16. While member 3 is in a lowered position, after having risen a suitable distance from the capping position, arm 18 is rocked (to the right in Fig. 9) to withdraw pin 14 from a recess 11, to permit member 3 to be rotated a step during its return or upward stroke to normal. For this purpose I have shown arm or lever 18ᵇ of rock arm 18 pivotally connected by a rod or link 20 with a rock lever 21, pivotally supported at 22 upon standard 2, and adapted to be operated intermittently by the cam-like projection 23ᵃ upon the disk or the like 23 that is carried by shaft 9 (Figs. 1ᵃ, 4 and 5). At 24 is a spring pressed dog or pawl (Figs. 1ᵃ, 4, 8, 9 and 18) shown pivotally supported at 25 upon standard 16, which dog is provided with a hook or the like 24ᵃ (Fig. 18) in position to normally engage a pin 12 at the proper moment during the upstroke of member 3, while pin 14 is temporarily retained out of a recess 11 of disk 10 by fork 18ᵃ, whereby during the remainder of such upstroke of member 3 the latter will be caused to rotate a step to bring a succeeding cap head 5 into capping position above a bottle. The link or rod 7 is shown provided with a depending projection 7ᵃ (Figs. 8, 9 and 11) carrying a pawl 26, shown adapted to rest upon an adjustable stop or screw 27, which pawl, during the downstroke, will freely pass the toe 24ᵇ of dog 24, and on the upstroke, said pawl 26 will engage said toe to tilt the hook 24ᵃ of dog 24 out of the path of pins 12. When member 3 is in the elevated position the part 24ᵃ of dog 24 will be beneath the lower right-hand pin 12, as viewed in Fig. 8. When member 3 descends the two right-hand pins will pass the dog 24 so that when a member 5 is applying a cap upon a bottle, the upper right-hand pin 12 will be below hook 24ᵃ (Fig. 18). After said member has risen free from the bottle, the fork 18ᵃ operates upon pin 14 to withdraw said pin from a recess 11, and retain said pin temporarily out of either of such recesses, and on the further upward movement of member 3 the fork 18ᵃ releases pin 14, which will then rest upon disk 10 and the upper right-hand pin 12 will engage hook 24ᵃ of dog 24, whereby, during continued upward movement of said member, it will be rotated substantially a quarter turn in the direction of the arrow a in Fig. 8, and then when a recess 11 of disk 10 has substantially registered with pin 14, the pawl 26 by engaging toe 24ᵇ will tilt dog 24 away from said pin 12. Spring 17 will thereupon push pin 14 into a recess 11, to again lock member 3 to slide 15 with a capping member 5 in operative position, and member 3 will rise further to permit dog 24 to pass under the lower right-hand pin 12, as illustrated in Fig. 8. By this means each time member 3 is given a complete down and up stroke, it will be rotated a step to bring the capping heads successively into the capping position.

While the capping heads 5 may be of any suitable construction, I have shown the same as adapted to slide radially in the bores 3ᵇ of member 3 for a suitable distance, a pin 3ᶜ and slot 3ᵈ between the parts 3ᵃ and 5 (Fig. 9) limiting the outward movement of each member 5. The members 5 are adapted to be pushed outwardly by a cam-like projection 28ᵃ, on a rod 28 mounted to slide within member 3, the latter having a recess 3ᵉ (Fig. 9) receiving said projection and the inner ends of the corresponding capping heads 5. The projection 28ᵃ is shown extending toward the bottles to be capped, and the capping heads 5 are shown provided with beveled anti-friction rollers 29 to engage the projection 28ᵃ and rod 28 (Figs. 9, 13 and 17). Rod 28 is shown provided with a shoulder 28ᶜ normally pushed leftwardly in Fig. 9 by a spring 30, said rod also having a second shoulder 28ᵈ normally engaging the abutment 3ᶠ of member 3, to retain said rod in normal position. The outer end of spring 30 bears against a stop 31 secured to member 3 (Fig. 9). An outer end of rod 28 is shown flattened at 28ᵇ to enter a corresponding opening in slide or block 15 (Figs. 8 and 9), whereby said rod is retained from rotation, and is raised and lowered with said block and member 3. Where the capping devices are duplicated in one machine there may be two such rods 28, arranged as described, in which event the left-hand rod (Fig. 6) may also be flattened at 28ᵇ to slide in a slotted guide 28ᵍ (Figs. 1, 1ᵃ and 6) to aid in keeping said rod 28 from rotation.

As each capping head 5, and the parts thereof, may be similar, a description of one may suffice for all, as follows: Within a recess 5ᶜ of capping head 5 is secured a ring 32 (Figs. 13, 14, 15, 16) as by screw threads, which ring is shown provided with a curved or convex lower face, at 32ᵃ, to guide bottle mouths and caps, and with an annular shoulder 32ᵇ upon which the caps or crowns 33 to be applied upon the bottle mouths, may rest when pushed or otherwise placed within ring 32, to be temporarily retained by said shoulder 32ᵇ (Fig. 13). At 34 is a plunger, shown guided in the reduced portion of recess 5ᶜ and normally pushed outwardly by spring 35, shown bearing against the bottom of recess 34ᵃ of plunger 34 and against the inner wall of recess 5ᶜ, so that when cap 33 is pushed inwardly within ring 32, the cap will be retained in proper position by plunger 34. Resting upon ring 32, and closely encircling the outer portion of plunger 34, are a series of radially disposed jaws or blocks 36, having their outer surfaces at 36ᵃ beveled or tapered inwardly. The laterally extending portions 36ᵇ of said jaws or blocks operate in an annular recess 5ᵈ in capping member 5, whereby said jaws or blocks may move radially respecting said member 5 but are prevented from moving longitudinally with respect thereto. The caps 33 are adapted to be forced or squeezed between the jaws or blocks 36 upon the bottle mouths. To this end the jaws or blocks 36 bear against a ring 37 adapted to slide frictionally within the recess 5ᶜ of capping member 5, said ring having an inner annular beveled or tapering surface 37ᵃ coacting with the corresponding surfaces 36ᵃ of the jaws or blocks 36. The ring 37 is adapted to bear against an annular shoulder 34ᵇ of plunger 34, said plunger thereby normally pressing ring 37 against jaws 36 to crowd the latter inwardly. Ring 37 is provided with a plurality of recesses 38 (Fig. 13) receiving springs 39 normally pressing outwardly to resist lateral movement of ring 37 within recess 5ᶜ, friction disks or plates 40 between said springs and member 5 serving to frictionally resist movement of ring 37. With the arrangement described, after a cap 33 has been placed within member 5 (Fig. 13) and such cap is first forced upon the bottle mouth, the plunger 34 will be pushed upwardly and the cap will be crowded, between the jaws 36 (lateral movement of the latter being resisted by ring 37), substantially as shown in Fig. 14, and then when the pressure is continued the jaws 36 engage the lower margin or skirt of cap 33 and press or crimp the same upon the bead A' of the bottle mouth, for finally securing the cap thereto (Fig. 16). When capping member 5 next recedes from the bottle the plunger 34 will be advanced by spring 35 to aid in pushing the cap 33 from between the jaws 36, whereupon (when the cap has been released) the parts resume their normal positions, the plunger 34 pushing the ring 37 outwardly, which in turn causes the jaws 36 to approach and resume their normal positions (Fig. 13). In cases where bottles are of unequal length, and a capping member 5 would tend to crush a bottle because of its length, the pressure upon the capping member 5 is relieved by the engagement of said member with projection 28ᵃ of rod 28, since at such time, by reason of the inclination of projection 28ᵃ or roller 29, or both, the rod 28 may slide against the resistance of spring 30 the required extent to relieve the pressure upon the bottle, the rod 28 being returned to its normal position by spring 30 when the pressure against said member 5 is released as said member rises from the bottle.

Figures 19, 21, 23, 24, 25:
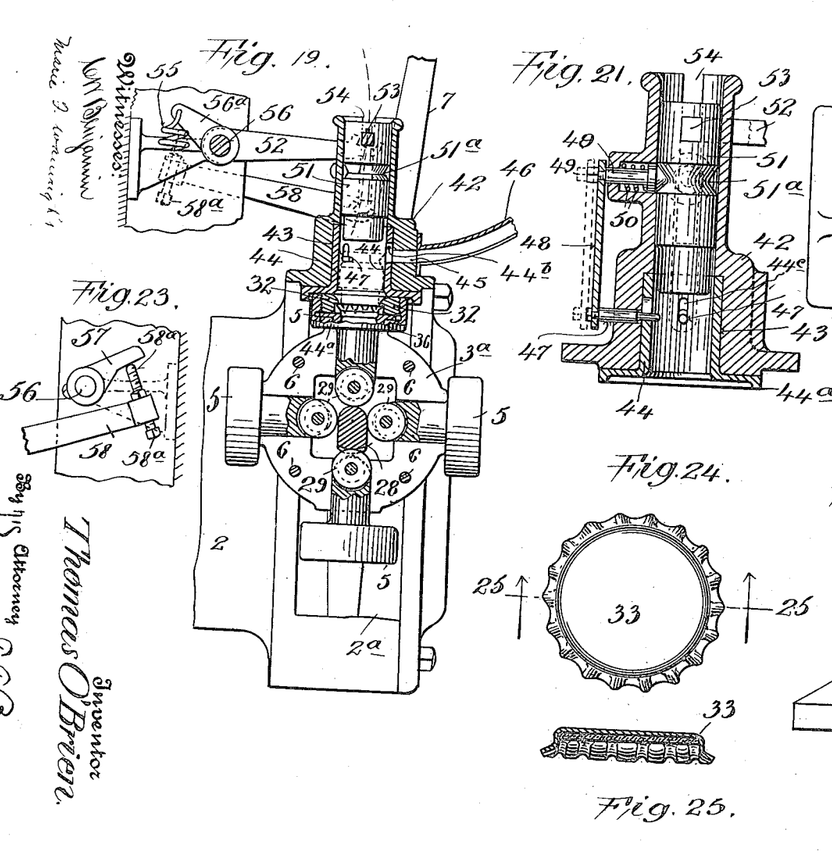
Fig. 19 is a sectional view on line 19, 19, in Fig. 4.
Fig. 21 is a section substantially on the line 21, 21, in Fig. 20.
Fig. 23 is a detail of part of Fig. 19, looking from the opposite side.
Fig. 24 is a plan view of a cap.
Fig. 25 is a section on the line 25, 25, in Fig. 24.
Figure 20:
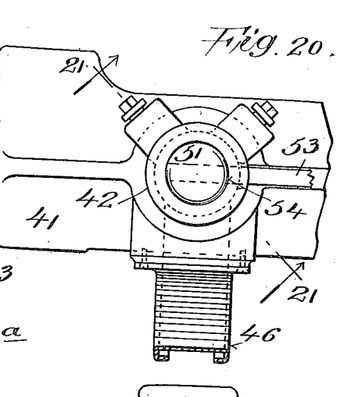
Fig. 20 is a detail plan view of Fig. 19.
Figure 22:
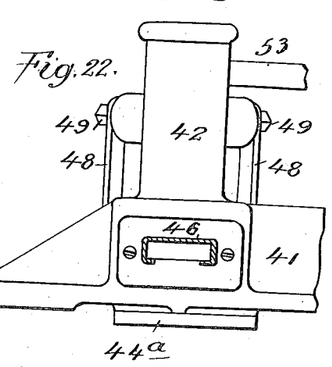
Fig. 22 is a face view of Fig. 20.

The caps 33 may be fed into the capping members 5 by hand or by any suitable mechanism. For this purpose I have shown means for automatically feeding the caps into the said members 5 at a point above the bottles. A cross bar 41 is shown carried by standards or uprights 2, and provided with a head or enlargement 42 above the head 3ᵃ. The head or enlargement 42 has a bore 43 slidably receiving a tube or sleeve 44 (Figs. 19 and 21), having a recessed flange 44ª adapted to oppose and coact with the capping members 5 as the latter are successively raised under the sleeve 44 (Fig. 19). Sleeve 44 is provided with a slot or opening 44ᵇ communicating with an opening 45 in head 42 that is in communication with a chute 46 (Fig. 19), through which caps or crowns 33 may be fed in any suitable manner. To temporarily retain the caps or crowns within sleeve 44, one or more pins 47 are movably carried in head 42, which pins project through slots 44ᶜ in sleeve 44 into the path of caps within the sleeve. The pins 47 are firmly connected by bars or rods 48 with plungers or pins 49 guided in bores in head 42 and normally pressed inwardly by springs 50 (Fig. 21) toward a reciprocative plug or plunger 51 (Figs. 9, 19 and 21) which is provided with an annular groove or recess 51ª to receive said plungers. The plug 51 is normally retained above slot 44ᵇ to permit the passage thereunder successively of caps to rest upon the pins 47, and when said plunger is depressed, while a capping head 5 is opposed to the sleeve 44, the pins 47 will be withdrawn from under the cap and the plug 51 will push said cap downwardly into the ring 32 of the opposing capping member. The plug 51 is reciprocated by means of a rock arm or lever 52 engaging a bar 53 projecting from plug 51 and adapted to travel in slots 54 of head 42 (Figs. 5, 6, 19 and 21). Bar 53 is normally held in an upward or outward position by spring 55 connected with the adjacent standard and with arm or lever 52 by means of crank 56ª on shaft 56 upon which said arm 52 is secured. Shaft 56 is shown provided with a projection 57 (Figs. 1ª, 6, and 7) adapted to be operated by an arm 58 projecting from link or rod 7, whereby as the latter rises with member 3 and the capping heads, and at such time that a capping head has engaged sleeve 44, the arm 58 will engage projection 57 and thereby rock the shaft 56, which will cause arm 52 to depress plug 51, whereupon plungers 49 and pins 47 will be moved outwardly to release a cap or crown from said pins, and the plug 51 will continue downwardly and push such cap or crown from sleeve 44 into the opposing capping head or member 5. When the capping head next descends and passes away from sleeve 44 the latter may slide downwardly until stopped by the pins 47, until a member 5 next pushes sleeve 44 upwardly. When arm 58 moves away from projection 57 the spring 55 will cause arm 52 to rise to raise plug 51 to permit pins 47 to return to normal, in position to allow a cap or crown to pass from chute 46 into sleeve 44 below the plug and so on, each time the capping members or heads 5 are reciprocated. An adjustable stop or screw 58ª (Fig. 23) on arm 58 enables proper timing of plug 51 for its descent to push caps into capping members or heads 5. The space between pins 47 and the lower end of block 51 is such that but one cap at a time may enter sleeve 44. The plug 51 is preferably suitably magnetized to attract caps, whereby if a cap should not have been placed upon a bottle and a capping head 5 carrying a cap should be presented toward sleeve 44, the cap on the plug will not be placed upon the cap in said member, but will adhere to and rise with the plug, because of the presence of the cap in said member, and because the flange of the cap on plug 51 will not enter ring 32, and the cap within sleeve 44 will be retained on the plug until the first empty member 5 is presented to receive said cap. It will be observed in Fig. 9 that when the capping member 5 is extended upwardly beneath sleeve 44, said capping member may slide inwardly in the recess 3ᵇ toward shaft 28, and, as member 3 is rotated, and the capping members 5 rotate around and engage the projection 28ª of rod 28, said members 5 will be pushed outwardly successively by said projection.

Where two or more sets of capping heads and cap feeding devices are provided in one machine, as illustrated in the accompanying drawings, the bar 53 may connect with the corresponding plugs 51, in the manner described with respect to one such set of parts, for operating said plugs together.

Figures 1A, 28, 29:
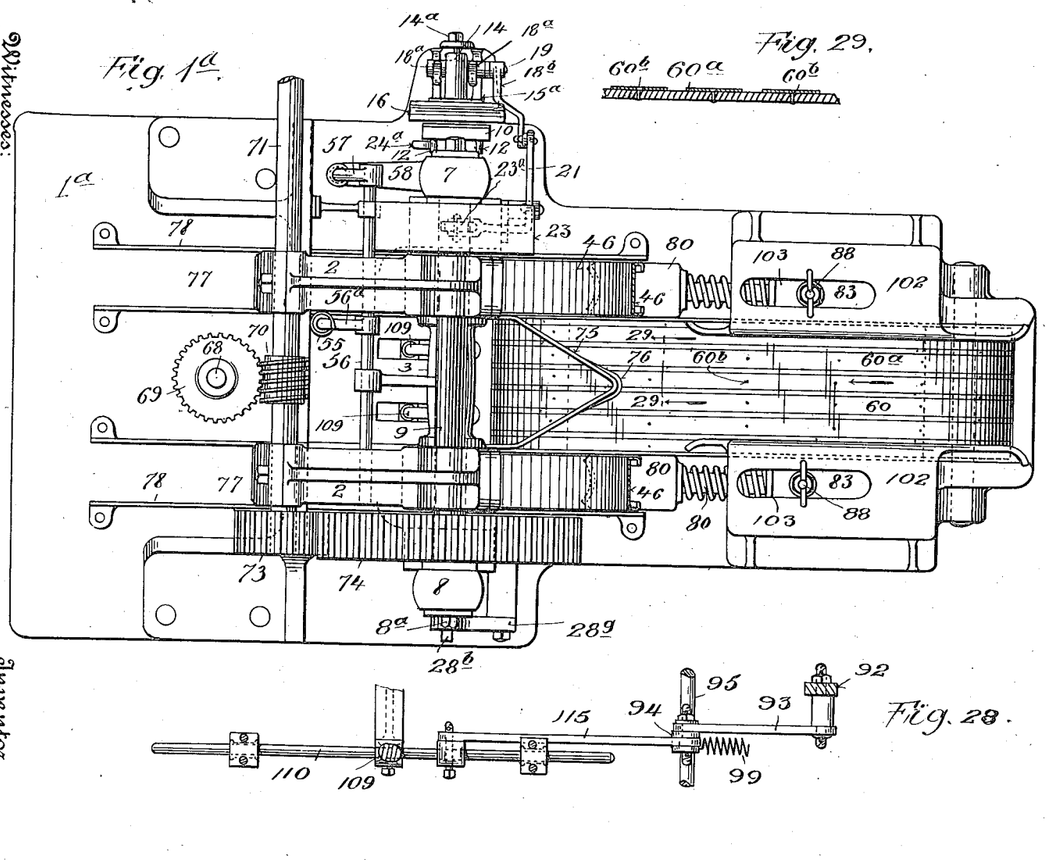
Fig. 28 (Sheet 2) is a partially inclined plan view of part of the bottle-feed operating devices, shown in side view in Fig. 27.
Fig. 29 is an enlarged section of the bottle conveyer, substantially on the line 29, 29, in Fig. 1ᵃ.
Figure 3:
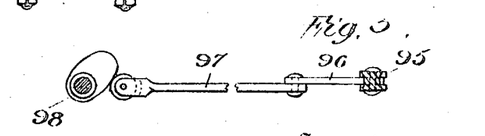
Fig. 3 is a detail, in section, on the line 3, 3, in Fig. 1.

The bottles may be successively placed beneath the capping heads by hand, as required, but in order to automatically feed bottles beneath said capping heads, I provide means, described as follows:

As before stated, the bottles are adapted to rest upon table or plate 1ª beneath the capping heads. In an opening 1ᵇ within said table or plate is located an endless conveyer 60, that is shown supported upon rollers 61 journaled in suitable bearings carried by plate 1ª, (Figs. 1, 5 and 27), whereby bottles placed upon said conveyer may be fed forwardly. Conveyer 60 may be made in any desired manner of any suitable material, but in order that the conveyer may not unduly feed the bottles by frictional contact I provide longitudinal metal strips 60ª which may be riveted to the conveyer, by rivets 60ᵇ, (Figs. 1ª and 29), enabling the conveyer to slide freely under the bottles if they become blocked (Fig. 29). The conveyer 60 may operate continuously, and for such purpose I have shown a sprocket wheel 62, connected with the shaft of one of said rollers 61 and receiving a chain 63 from a driving sprocket 64 secured on shaft 65 having a bevel gear 66 meshing with a bevel gear 67 secured upon shaft 68, shown journaled in bearings on the main frame and standard 2. Shaft 68 is shown provided with a worm wheel 69 in mesh with a worm 70 secured on shaft 71 shown journaled in bearings on standards 2, which shaft has a pinion 73 in mesh with a gear 74 on shaft 9. Shaft 71 may be driven by a belt and pulley or in any suitable manner, whereby member 3 may be reciprocated by means of the links or rods 7, 8, and conveyer 60 may be operated in proper order.

Figure 26:
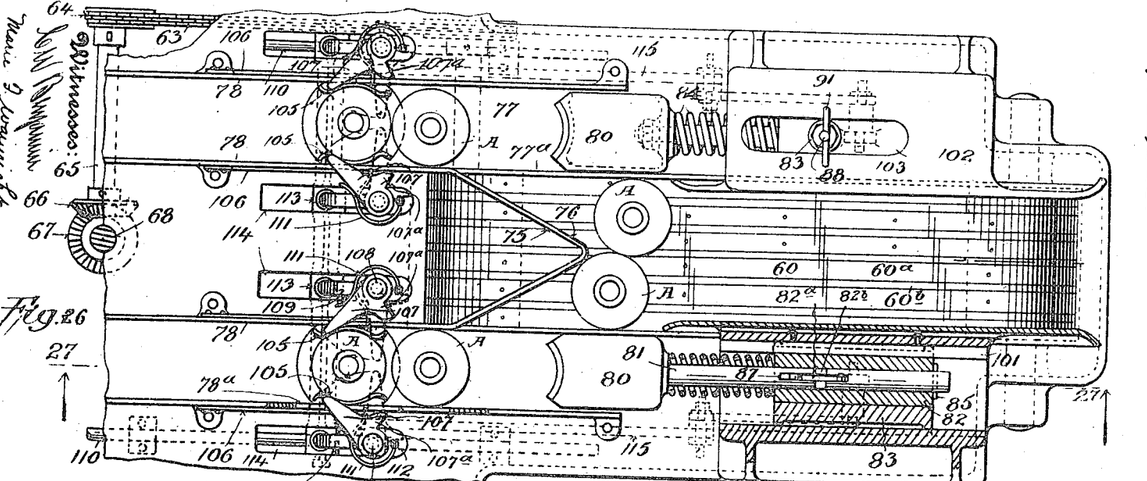
Fig. 26 is a plan view of the bottle feeding devices, with the capping devices removed, partly in section on the line 26, 26, in Fig. 27.

At the forward portion of the conveyer is a bottle deflector 75, shown in tapering form adapted to direct bottles laterally from conveyer 60 (Figs. 1a and 26.) The apex of conveyer 75 may be provided with a cushion of rubber or the like 76 to engage the bottles. Since the machine illustrated is adapted to simultaneously cap two bottles beneath the corresponding heads 3a, I have shown guideways 77, longitudinally disposed on opposite sides of the machine, and provided between parallel walls or rails 78 upstanding and secured upon plate 1a, side openings 77a being provided adjacent to the inner portion of conveyer 60 for the passage of bottles to the guideways 77 (Fig. 26). As the bottles are fed forwardly on the conveyer and engage the deflector 75, the bottles will be directed through the openings 77a into the appropriate guideway 77.

Figure 27:
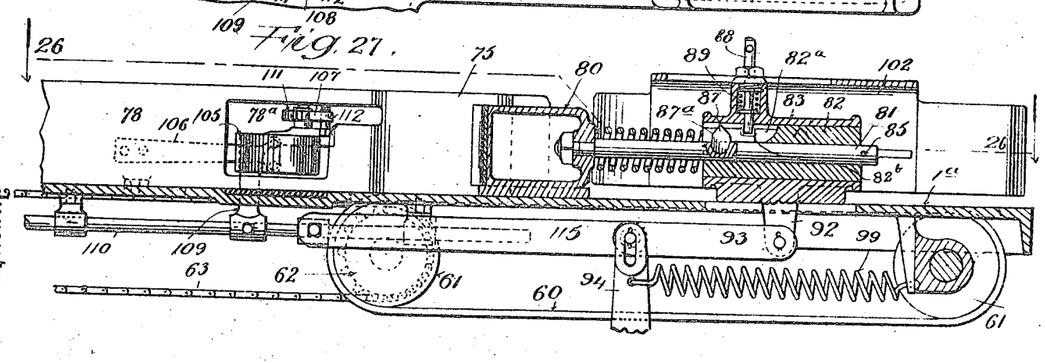
Fig. 27 is a longitudinal section, substantially on the line 27, 27 of Fig. 26.

In order to feed the bottles along the guideway 77 to a position below the capping heads, after the bottles pass from conveyer 60, I provide a reciprocative plunger 80 adapted to travel past the opening 77a and within guideway 77, and I also provide means to stop the operation of such plunger in the event that a bottle becomes broken in front of the plunger. To this end said plunger is shown carried by a rod 81 that is fitted to slide within a block 82 that is slidably supported within cylinder 83. A spring 84 surrounding rod 81 and bearing against plunger 80 and block 82 normally pushes said plunger forwardly, a pin 85 on said rod limiting its forward movement. By means of a key 86 the block 82 is kept from rotating within cylinder 83. Block 82 is shown provided with a longitudinal slot or groove at 82a (Fig. 2), receiving a cam-like member 87 secured in a seat in rod 81 (Figs. 2, 26 and 27). A pin 88 carried by cylinder 83 is normally pressed downwardly into a recess or cross groove 82b in block 82, which recess communicates with slot 82a, whereby pin 88 is normally in the path of cam member 87. For this purpose I have shown cylinder 83 provided with a tubular extension 83a receiving said pin and containing a spring 89 bearing against a shoulder 88a on said pin and against a stop 90 on extension 83a (Fig. 2). By means of a projection or head 91 on pin 88, said pin may be lifted as desired.

Cylinder 83 is shown supported in suitable guideways at 101 upon table 1a (Figs. 2 and 26) whereby said cylinder is free to slide. At 102 is a shield over the cylinder secured upon table 1a and shown provided with a slot 103 receiving pin 88, whereby said pin is free to reciprocate.

Figure 4:
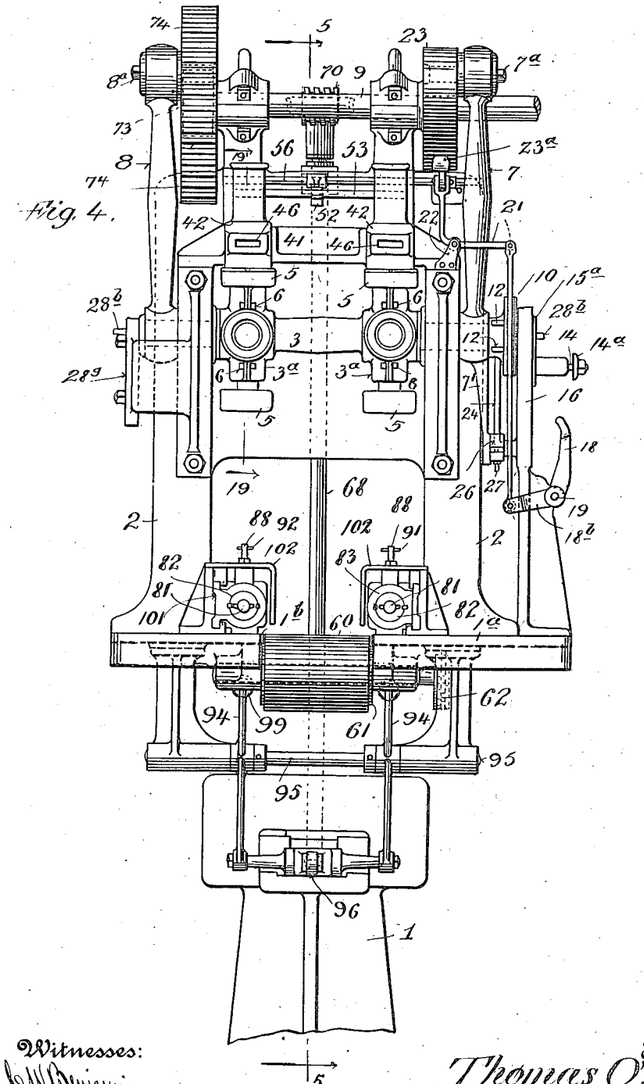
Fig. 4 is an end view of Fig. 1.
Figure 5:
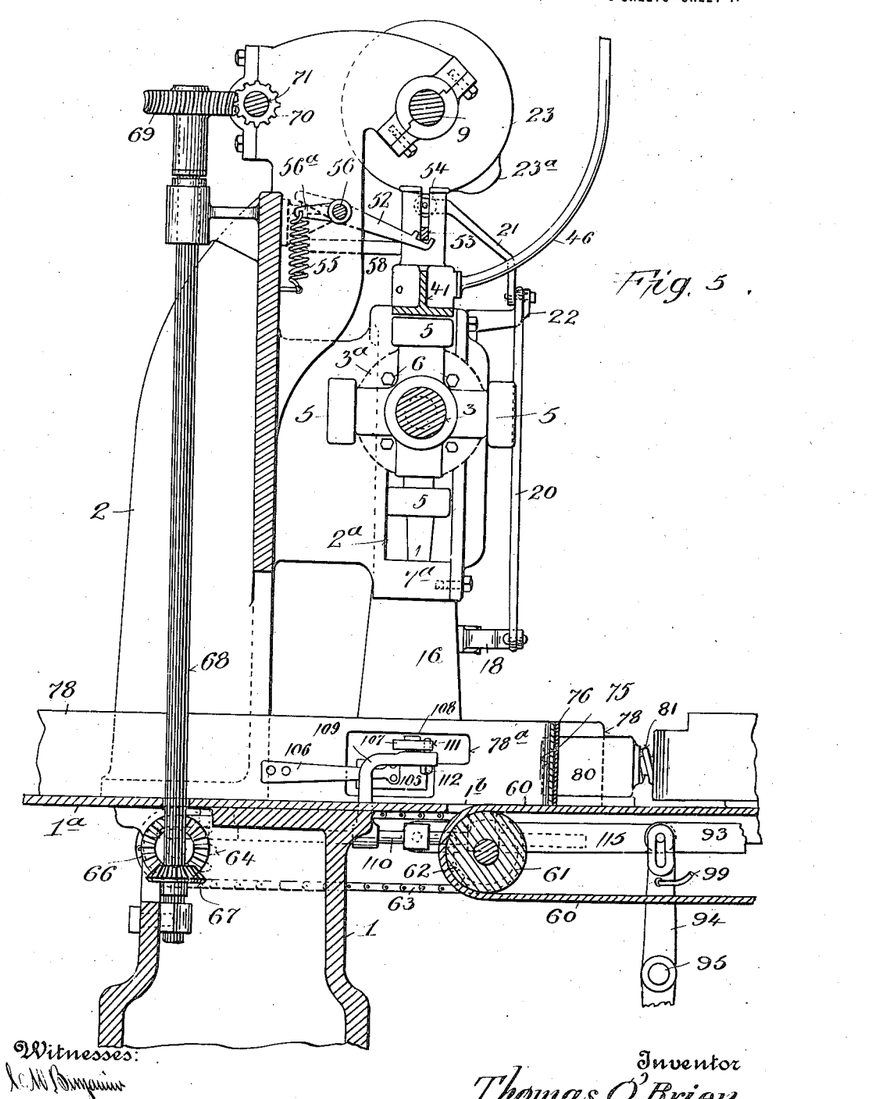
Fig. 5 is a section substantially on the line 5, 5, in Fig. 4.

Cylinder 83 is shown provided with a projection 92 extending through a slot in plate 1a and pivotally connected by a link 93 with a crank arm 94 secured on a rock shaft 95 supported in bearings on plate 1a. The lower extension of arm 94, is shown connected by a link 96 with a sliding rod or pitman 97, adapted to coact with a cam 98 on shaft 68 whereby as said shaft is rotated the cylinder 83 will be reciprocated. The machine is shown provided with two arms 94 for operating the two cylinders 83 simultaneously, both of said arms being operated together by connection with the shaft 95 (Fig. 4). A spring or springs 99 connecting the main frame with arm 94 operates in conjunction with cam 98. The bottles being jointly fed forward by conveyer 60 will pass between deflector 75 and plunger 80 when the latter is retracted, and as the plunger is moved forward by and with cylinder 83, the bottles are fed along guideway 77 successively, step by step. Should a bottle be broken in front of plunger 80 and stop the progress of the plunger, the spring 84 will be pressed, but block 82 will continue to move forwardly with cylinder 83, and when said pin 88 engages cam 87 said pin will ride up and over the cam and drop in front of the forward portion 87a of the cam, disengaging cylinder 83 from plunger 80, (Fig. 27), so that no further pushing action of the plunger will take place on the bottles, whereupon the machine may be stopped.

When the bottles are fed by the plunger 80 to the bottle capping position they are temporarily retained in guideway 77 by retainers 105, which are carried by spring arms 106 secured upon the walls 78 (Figs. 1 and 5) in register with openings 78a in said walls, whereby said retainers are free to move laterally when a bottle passes between or from them. The retainers 105 are shown in curved form, having central depressions to receive the bottles and curved end portions to admit the bottles between them and permit their ready discharge therefrom (Fig. 26). While the bottles may successively feed one another toward and from the capping position, I find it advantageous to provide means to automatically feed the bottles away from the capping position after the caps have been applied on the bottles. To this end I have shown fingers 107 (Figs. 1, 5, 26 and 27) normally extending crosswise with respect to guideway 77, and pivotally supported at 108 upon arms 109 projecting from reciprocative rods 110 guided in suitable bearings on plate 1a. The fingers 107 are adapted to operate in the slots or openings 78ª, and are normally held extending in a direction across guideway 77 by springs 111 secured to stops at 112 on arm 109, the stop or the like 112 serving as a back-stop for the toe 107ª of the corresponding finger 107, whereby the latter is resiliently retained in position to push bottles. Since I have shown two arms 109 and two fingers 107 for each guideway 77, I have shown said arms carried by a cross bar 113 secured to the corresponding rods 110, whereby when said rods reciprocate all of the fingers 107 will correspondingly reciprocate. Arms 109 are shown passing through slots 114 in plate 1ª (Figs. 1ª and 26). To reciprocate rods 110 and fingers 107 at the proper times, said rods are shown pivotally connected by links 115 with the rock arms 94 (Figs. 1, 4, 5, 26, 27 and 28), whereby as the plunger 80 is moved on the feeding stroke the corresponding fingers 107 will feed to discharge a capped bottle from between the retainers 105. When the fingers 107 return they engage a bottle that has been pushed by plunger 80 between retainers 105, and said fingers turn on their pivots and snap behind a bottle between said retainers. The plungers 80 and fingers 107 in Fig. 26 are shown in a position between the extremes of stroke of plunger 80 and fingers 107.

A description of the operation of the machine may be generally as follows:

Caps may be considered to be in position in all of the capping members 5 except the one at the left in Fig. 18, the plunger 80 retracted toward the right in Fig. 26, caps in position in the sleeves 47 and bottles in position between retainers 105. The machine now being started, the conveyer 60 propels bottles continuously toward deflector 75, and member 3 descends, carrying caps down upon the bottles. When the caps have been seated upon the first named bottles member 3 rises, whereupon pins 14 are pulled out of recesses 11, dogs 24 cause the capping heads to rotate a step, pins 14 are released to engage other recesses 11, and member 3 rises to cause caps to be deposited in upturned capping members 5 from sleeves 44, and after the capping members 5 have released said bottles, the plungers 80 move forwardly, together with the fingers 107. Said fingers push the capped bottles from the retainers 105 and plungers 80 push bottles into place between said retainers, the member 3 again descends to apply caps upon the bottles, and so on continuously. The capped bottles may be removed from plate 1ª, as delivered from the guideways 77, in any suitable manner.

My invention is not limited to the details of construction and arrangement of parts set forth, as the same may be varied, within the scope of the appended claims, without departing from the spirit of my invention.

Having now described my invention what I claim is:—

1. A capping member having a recess, jaws within the recess adapted to coact with a cap, means to support said jaws for lateral movement, a ring coacting with said jaws, means to frictionally resist movement of said ring by said jaws, and means to retain a cap in operative position with respect to said jaws.

2. A capping member having a recess, jaws within the recess adapted to coact with a cap, means to support said jaws for lateral movement, a ring coacting with said jaws, one or more springs interposed between said ring and member to frictionally resist movement of said ring by said jaws, and means to retain a cap in operative position with respect to said jaws.

3. A capping member having a recess, jaws within the recess adapted to coact with a cap, means to support said jaws for lateral movement, a ring coacting with said jaws, means to frictionally resist movement of said ring by said jaws, means to retain a cap in operative position with respect to said jaws, a plunger slidable within said jaws and a spring normally pushing said plunger outwardly.

4. A capping member having a recess, jaws within the recess adapted to coact with a cap, means to support said jaws for lateral movement, a ring coacting with said jaws, means to frictionally resist movement of said ring by said jaws, means to retain a cap in operative position with respect to said jaws, a plunger slidable within said jaws, and a spring normally pushing said plunger outwardly, said plunger having means coacting with said ring to normally push said ring outwardly.

5. A capping member having a recess, jaws within the recess adapted to coact with a cap, means to support said jaws for lateral movement and prevent longitudinal movement thereof within said member, a movable ring coacting with said jaws, said ring and jaws having coacting inclined faces, a plunger to eject a capped bottle and coactive with said ring to restore it to the normal position, and means to retain a cap in operative position with respect to said jaws.

6. A capping member having a recess, jaws within the recess adapted to coact with a cap, means to support said jaws for lateral movement and prevent longitudinal movement thereof within said member, a ring coacting with said jaws, said ring and jaws having coacting inclined faces, means to retain a cap in operative position with respect to said jaws, a plunger having a portion movable within said jaws and ring, and a spring normally pushing said plunger outwardly.

7. A capping member having a recess, jaws within the recess adapted to coact with a cap, means to support said jaws for lateral movement and prevent longitudinal movement thereof within said member, a ring coacting with said jaws, said ring and jaws having coacting inclined faces, means to retain a cap in operative position with respect to said jaws, a plunger having a portion movable within said jaws and ring, said plunger having means coacting with said ring to normally push the latter outwardly, and a spring normally pushing said plunger outwardly.

8. A capping member having a recess, jaws within the recess adapted to coact with a cap, means to support said jaws for lateral movement, a movable ring coacting with said jaws, a plunger to eject a capped bottle and coactive with said ring to restore it to the normal position, and a ring carried by said member without said jaws, said ring having means to retain a cap within said member.

9. A capping member having a recess, jaws within the recess adapted to coact with a cap, means to support said jaws for lateral movement and prevent longitudinal movement thereof within said member, a movable ring coacting with said jaws, said ring and jaws having coacting inclined faces, a plunger to eject a capped bottle and coactive with said ring to restore it to the normal position, and a ring carried by said member without said jaws, said ring having means to retain a cap within said member.

10. The combination of a rotative head, capping members carried by the head, means to reciprocate said head with respect to a stationary bottle, means to rotate said head during one of its reciprocative strokes, means to lock and release said head, and means coactive with said capping members to project them to the capping position and to compensate for variation in bottle lengths with respect to said heads when in such capping position.

11. The combination of a rotative head, capping members carried by the head, means to reciprocate said head, means to rotate said head during one of its reciprocative strokes, means to lock and release said head, and means to cause said capping members to be projected radially for the capping position and to permit said members to recede from such position.

12. The combination of a reciprocative head, capping members carried by the head, means to reciprocate said head, means to lock and release said head, said head having projections corresponding to the capping members, a dog to engage said projections during one direction of movement of said head to rotate said head step by step, and means to release the dog from a projection.

13. The combination of a reciprocative head, capping members carried by the head, means to reciprocate said head, said head having lock and release said head, said head having projections corresponding to the capping members, a dog to engage said projections during one direction of movement of said head to rotate it step by step, and an extension connected with said head to reciprocate therewith and having means to coact with said dog to cause it to release the projection.

14. The combination of a reciprocative head, capping members carried by the head, means to reciprocate said head, means to lock and release said head, said head having projections corresponding to the capping members, a dog to engage said projection during one direction of movement of said head to rotate it step by step, and an extension connected with said head, said extension having a pawl adapted to coact with said dog when moving in one direction to release the dog from said projection, said pawl being adapted to freely pass the dog when said head moves in a reverse direction.

15. The combination of a rotative head, capping members carried by the head, means to reciprocate said head, said head being provided with recesses and projections corresponding to the capping members, a slide, a pin carried by said slide to coact with said recesses, a dog to coact with said projections, means to release the pin from a recess when said head moves in one direction, and means to release the dog from a projection after the head has rotated a step when said head moves in said direction.

16. The combination of a rotative head, capping members carried by the head, means to reciprocate said head, said head being provided with recesses and projections corresponding to the capping members, a slide, a pin carried by said slide to coact with said recesses, a dog to coact with said projections, a fork adapted to coact with said pin, and means to actuate said fork to release the head from the slide after said head is moved away from a bottle.

17. The combination of a rotative head, capping members carried by the head, means to reciprocate said head, said head being provided with recesses and projections corresponding to the capping members, a slide, a pin carried by said slide to coact with said recesses, a dog to coact with said projections, a fork to actuate said pin, a cam operative with the means that reciprocates the head, and connections between the cam and fork to operate the latter.

18. The combination of a rotative head, capping members carried by the head, means to reciprocate said head, said head being provided with recesses corresponding to the capping members, a slide, a pin carried by said slide to coact with said recesses, a fork adapted to coact with said pin, means to actuate said fork to release the head from the slide after said head is moved away from a bottle, a dog, means connected with the capping head to coact with the dog to rotate said head after said pin releases the head, and means to actuate the dog to release the head therefrom after the head is rotated one step away from a bottle.

19. The combination of a rotative head, capping members carried by the head, means to reciprocate said head, said head being provided with recesses corresponding to the capping members, a slide, a pin carried by said slide to coact with said recesses, a fork to actuate said pin, a cam operative with the means that reciprocates the head, connections between the cam and fork to operate the latter, a dog, means connected with the head to coact with the dog, and means operative with the head to release the dog from the head after the fork has operated the pin to release the head and on the same stroke of said head.

20. The combination of a rotative head, capping members carried by the head, means to reciprocate said head, means to rotate said head step by step, means to retain the head in operative capping position, a rod having a projection to coact with said capping members to project them outwardly, means to retain said rod from rotation, and means to resist movement of said rod by a capping member.

21. The combination of a rotative head, capping members carried by the head, means to reciprocate said head, means to rotate said head step by step, means to retain the head in operative capping position, a rod having a projection to coact with said capping members to project them outwardly, means to retain said rod from rotation, and a spring coacting with said rod to resiliently resist its movement by a capping head.

22. The combination of a rotative head, capping members carried by the head, means to reciprocate said head, means to rotate said head step by step, means to retain the head in operative capping position, a rod having a projection to coact with said capping members to project them outwardly, a slide operatively connected with said rod to retain the latter from rotation, and a spring coacting with said rod to resiliently resist movement of said rod by a capping head.

23. The combination of a rotative head, radially disposed capping members carried by the head, means to slidably retain said members upon said head, means to reciprocate said head, means to rotate said head during one of its reciprocative strokes, a rod slidable longitudinally of said head between said capping members and provided with a projection to coact with said members to project them outwardly, a slide, means to guide said slide with said head, said slide having means to retain said rod from rotation, a spring coacting with said rod to resist its movement by the capping members, means for locking said head to said slide on the capping stroke, and means to release said last named means from said slide on the reverse stroke.

24. The combination of a rotative head having a plurality of radially disposed bores, capping members slidable in said bores, means to rotate said head step by step, means to cause said members to be projected from an inward to a capping position as said head rotates, means to retain said head from rotation on the capping stroke, and means to release said last named means on the return stroke to permit its rotation.

25. The combination of a rotative head having a plurality of radially disposed bores, capping members slidable in said bores, means to rotate said head step by step, means to cause said members to be projected to a capping position as said head rotates, means to retain said head from rotation on the capping stroke, means to release said last named means on the return stroke to permit its rotation, and means to resiliently resist the capping members during the capping operation to accommodate bottles of varying lengths.

26. The combination of a rotative head, capping members carried by the head, means to rotate said head step by step, means to lock and release said head, a second head having a bore to receive caps, means to support said second head independently of and above the first named head, means to feed caps into said bore, means to retain and release caps in said bore, means to feed caps from the bore into the capping members, means to move the first named head away from the second named head and toward a bottle to apply a cap thereon and to move the first named head from the bottle to release the latter, and toward the second named head to receive a cap therefrom.

27. The combination of a rotative head, capping members carried by the head, means to reciprocate said head, means to rotate said head step by step, means to lock and release said head, a second head having a bore to receive caps and provided with a passage leading to said bore, one or more pins adapted to project into said bore to retain caps therein, means to retract said pins and release caps, and means to push caps from said bore into the capping heads.

28. The combination of a rotative head, capping members carried by the head, means to reciprocate said head, means to rotate said head step by step, means to lock and release said head, a second head having a bore to receive caps and provided with a passage leading to said bore, one or more pins adapted to project into said bore to retain caps therein, a plug to push caps from the bore into the capping members, and means actuated by said plug to operate said pin or pins.

29. The combination of a rotative head, capping members carried by the head, means to reciprocate said head, means to rotate said head step by step, means to lock and release said head, a second head having a bore to receive caps and provided with a passage leading to said bore, one or more pins adapted to project into said bore to retain caps therein, a plug to push caps from the bore into the capping members, a plunger, means coactive between the plunger and plug for operating the former by the latter, and means connecting the plunger with a pin to operate the latter with the plunger to retain and release caps within the bore.

30. The combination of a rotative head, capping members carried by the head, means to reciprocate said head, means to rotate said head step by step, means to lock and release said head, a second head having a bore to receive caps, a sleeve slidable within said bore, means to support said second head above the first named head, means to feed caps into said sleeve, said sleeve having a slot, a pin operative in said slot to retain and release caps in the sleeve, and means to feed caps from the sleeve into the capping members.

31. The combination of a rotative head, capping members carried by the head, means to reciprocate said head, means to rotate said head step by step, means to lock and release said head, a second head having a bore to receive caps, a sleeve slidable within said bore, means to support said second head above the first named head, means to feed caps into said sleeve, said sleeve having a slot, a pin operative in said slot to retain and release caps in the sleeve, a plug in said bore adapted to operate in said sleeve, and means operated by said plug to actuate said pin.

32. The combination of a rotative head, capping members carried by the head, means to reciprocate said head, means to rotate said head step by step, means to lock and release said head, a second head having a bore to receive caps, a sleeve slidable within said bore, means to support said second head above the first named head, means to feed caps into said sleeve, said sleeve having a slot, a pin operative in said slot to retain and release caps in the sleeve, a plug in said bore adapted to operate in said sleeve, a plunger connected with said pin, said plug having a recess receiving and coacting with said plunger, and a spring normally pushing the plunger toward the plug.

33. The combination of a member having radial bores, spaced heads provided with bores, means to recapping members in said bores, means to rotate said member, means to reciprocate said member during one of its reciprocative strokes, means to lock and release said member, cap retaining heads above said capping members and provided with bores, means to guide caps into said bores, pins to retain and release caps in said bores, plugs operative in said bores, means actuated by said plugs to operate said pins, a bar connected with said plugs, and means to operate said bar to reciprocate said plugs simultaneously.

34. The combination of a head having a bore to receive caps, means to feed caps into said bore, means to retain and release caps in said bore, a magnetized plug to push caps through said bore, and a capping head having cap-holding means to receive caps from said bore.

35. The combination of a head having a bore to receive caps, means to feed caps into said bore, one or more pins adapted to project in said bore, means to retract said pins and release caps, and a magnetized plug to push caps through said bore and retain caps temporarily above said pins, and a capping head having cap holding means to receive caps from said bore.

Signed at New York city, in the county of New York and State of New York, this 3rd day of February, A. D. 1915.

THOMAS O'BRIEN.

Witnesses:
T. F. BOURNE,
MARIE F. WAINRIGHT.